United States Patent [19]

Rickwood et al.

[11] Patent Number: 5,446,151
[45] Date of Patent: Aug. 29, 1995

[54] PHOTO REACTIVE SPIRO-BENZOXAZINE COMPOUNDS

[75] Inventors: Martin Rickwood, Southport; John D. Hepworth, Preston; Christopher D. Gabbutt, Blackburn; Sean D. Marsden, St. Helens, all of United Kingdom

[73] Assignee: Pilkington plc, St. Helens, United Kingdom

[21] Appl. No.: 160,184

[22] Filed: Dec. 2, 1993

[30] Foreign Application Priority Data

Dec. 3, 1992 [GB] United Kingdom ............... 9225347

[51] Int. Cl.$^6$ ........................................ C07D 265/14
[52] U.S. Cl. ...................................... 544/71; 252/586
[58] Field of Search ........................................ 544/71

[56] References Cited

U.S. PATENT DOCUMENTS

| | | | |
|---|---|---|---|
| 4,913,544 | 4/1990 | Rickwood et al. | 351/163 |
| 4,931,219 | 6/1990 | Kwiatkowski et al. | 252/586 |
| 4,968,454 | 11/1990 | Crano et al. | 252/586 |
| 5,017,698 | 5/1991 | Machida et al. | 544/71 |

FOREIGN PATENT DOCUMENTS

| | | |
|---|---|---|
| 0146135 | 6/1985 | European Pat. Off. . |
| 0141407 | 6/1988 | European Pat. Off. . |
| 0294056 | 12/1988 | European Pat. Off. . |
| 0245020 | 10/1991 | European Pat. Off. . |
| 0449669 | 10/1991 | European Pat. Off. . |
| 2049297 | 3/1971 | France . |
| 1310918 | 3/1973 | United Kingdom . |
| 1515641 | 6/1978 | United Kingdom . |
| 1515642 | 6/1978 | United Kingdom . |
| 2190088 | 12/1989 | United Kingdom . |
| WO85/02619 | 6/1985 | WIPO . |
| WO87/00524 | 1/1987 | WIPO . |

OTHER PUBLICATIONS

Tateoka et al., Chem. Abs. 109:160,660, and 109:83,544, 1988.
C. B. McArdie, "*Applied Photochromic Polymer Systems*", 1992, Chapter 2, pp. 33–34.
Alan R. Katritzky and Kunihiko Akutagawa, "*A Practical Synthetic Method for N–Methyl–o–Toluidine*", OPPI Briefs, vol. 21, No. 3, 1989, pp. 340–341.
Alan R. Katritzky, Stanislaw Rachwal and Bogumila Rachwal, "*The Chemistry of Benzotriazole, Part 3*.[1] *The Aminoalkylation of Benzotriazole*", J. Chem. Soc. Perkin Trans. 1, 1987, pp. 799–804.
Louis F. Fieser, "*β–Naphthoquinone and α–Naphthoquinone*", Organic Synthesis 1937, 17, pp. 68–72.
Katsuhira Yoshida, Tetsunao Koujiri, Norio OGA, Miwa Ishiguro and Yuji Kubo, "*The Effect of Metal Chelate Complexation on The Reactivity and Absorption Spectra of 1,2–Naphthoquinones: The Synthesis of New Types of Near I.r. Absorbing Dyes*", J. Chem. Soc. Chem. Commun., 1989, pp. 708–710.
Marshall Gates, "*The Condensation of Naphthoquinones With Polar Ethylenes*", from the Marian Edwards Park Laboratory of Bryn Mawr College, Jan. 1944, vol. 66, pp. 124–130.

Primary Examiner—Mukund J. Shah
Assistant Examiner—Matthew V. Grumbling
Attorney, Agent, or Firm—Burns, Doane, Swecker & Mathis

[57] ABSTRACT

A photo reactive material, such as a photochromic material, which has the following structure:

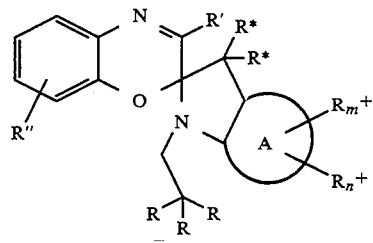

where
the variables, A, R, R', R'', R*, R+, m, and n are defined in claim 1.

18 Claims, No Drawings

PHOTO REACTIVE SPIRO-BENZOXAZINE COMPOUNDS

The present invention relates to a photo reactive material, commonly known as a photo chromic material, and, in particular, to photo reactive materials which can be used when dispersed in a polymeric material, for example, polyurethane.

For a long period of time photo reactive materials have been known. In the early years these materials were limited in their use to situations where they were dispersed in glass media, for example GB 1515641 discloses photochromic materials For use in boro-silicate glass and GB 1515642 discloses photochromic materials for use in alumino phosphate glass.

In recent years with the movement of related industries to the replacement of the expensive glasses with polymeric materials there has been a lot of work in developing photo reactive materials that work in polymeric environments. To a degree the following two patents/patent applications of this applicant have solved the problem and provided a suitable solution; European 87303819.4 and European 88304403.4.

These patent applications respectively relate to a suitable spiro-oxazine structure of material for use as a photo reactive material, and a polymeric system for locking the photo reactive material into a structure.

The development of photo chromic/photo reactive materials which can be used in polymeric systems has been moving forward at a fairly rapid rate, and consequently some problems have been encountered.

One of these is that most suitably coloured systems will actually incorporate a mixture of differing materials which have differing colours of activation. Unfortunately, also most of these materials have different recovery times to the uncoloured state. Therefore, as the activated system recovers it undergoes an apparent colour change. In some circumstances this can lead to a garish unacceptable colour.

Broadly speaking the whole of this problem revolves around the kinetics of the materials involved in the system.

The present invention is concerned with providing a solution to the above mentioned problem by finding a means by which the kinetic behaviour of a material can be controlled or adapted.

In accordance with the present invention a photo reactive material has the following structure:

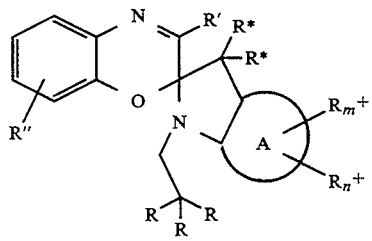

where

A is a six membered carbocyclic or heterocyclic ring;
each R is alkyl, alkenyl, alkynyl, aryl, carbocyclic, heterocyclic, alkyl carbocyclic or alkyl heterocyclic, or at least two of the R groups together form part of a carbocyclic or heterocyclic ring or one of the R groups is hydrogen with the other two being selected from above;

R* are independent of one another and are selected from branched or linear $C_1$-$C_{10}$ alkyls and carbocyclic or heterocyclic groups or both form part of a carbocyclic or heterocyclic ring;

$R_m+$ is selected from alkyl, alkoxy, amino, halogen, cyano, nitro, trifluoromethyl or aryl and m has a value between 0 and 4;

$R_n+$ is selected from carbocyclic and heterocyclic groups which are fused to A and n has a value between 0 and 2.

R' is selected from hydrogen, alkyl, alkoxy, amino, carbocylic of heterocyclic.

R" is selected from hydrogen, alkyl, aryl, heteroaryl, alkenyl, alkynyl, alkoxy, aryloxy, amino, halogen, cyano, nitro, trifluoromethyl, imino, azo, carboxy ester, amide or is a carbocyclic or heterocyclic group fused to the moiety.

In a second form the present invention comprises a photo reactive material which has the following structure:

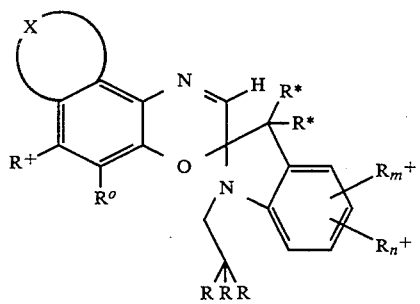

where

R are independent of one another and are selected from the following: alkyl, alkenyl, alkynyl, carbocyclic heterocyclic, alkylcarbocyclic or alkylheterocyclic
or at least two of the R groups together form part of a carbocyclic ring
or one of the R group is hydrogen with the other 2 being selected from the above listing;

R* are independent of one another and are selected from branched or linear $C_1$-$C_{10}$ alkyl or carbocyclic or heterocyclic or both form part of an alicyclic ring;

$R+_m$ is selected from hydrogen, aryl, alkyl, alkoxy, amino, halogen, cyano or nitro and m has a value between 0 and 4;

$R_n+$ is selected from alicyclic, heterocyclic, aryl or heteroaryl groups and n has a value between 0 and 2;

R+ are independent and are selected from hydrogen, alkyl, aryl, heteroaryl, alkenyl, alkynyl, alkoxy, aryloxy, amino, halogen, cyano, nitro, trifluromethyl, imino, azo, carboxy ester, amide, or both form part of a carbocyclic or heterocyclic ring;

R" is selected from hydrogen, alkyl, alkoxy, acyl, phenyl, an halogen, cyano group, nitro group, an amine group, or trifluro methyl or former part of a alicyclic, acyl or hetero aryl group;

and

X is nitrogen of a —CH— group contained in a carbocyclic ring or heterocyclic ring.

In the present invention the presence of the tertiary/quarternary alkylmethylene (—N—$CH_2$—$CR_3$) grouping close to the photoactive centre of the molecule affects the rate at which the photoactive material recovers. Further by controlling the groups attached to the tetrahedral —$CR_3$ part of this grouping the kinetics of the molecule recovery can be further adjusted and controlled.

In essence the kinetics of the photo reactive material can be adjusted and controlled, and the grouping in question has little or no effect on the colour of the molecules formed in the activated state. Therefore, the kinetics of the materials used in a system can be suitably adjusted to control the fade back/recovery of the material involved.

In essence the placement of the —$CH_2$— in the =N—$CH_2$—$CR_3$ grouping between the nitrogen and tetrahedral $CR_3$ slows up dramatically the kinetics of the recovery from the activated state. Consequently, one distinct advantage which is seen over the currently available materials is due to the slower relative recovery rate. As a result of the slower recovery rate the activated material stays in the coloured state longer. Consequently, at any one time more of the photo reactive material will be in the activated/coloured state. The net result of this is the article containing the photoreactive material has a higher induced darkness at a particular temperature.

In one arrangement of the present invention at least two of the R groups form part of an alicyclic ring which is cyclohexyl, adamantyl or norbornyl in structure.

The suitable $C_1$-$C_{10}$ alkyl for representation as the R* group includes methyl, ethyl, n-propyl, isopropyl, n-butyl, isobutyl, t-butyl, n-pentyl, neopentyl and isopentyl.

In one particular embodiment of the present invention the R* groups form part of an alicyclic ring which is cyclo hexyl, adamantyl or norbornyl in structure.

In one particular arrangement of the present invention the R+ and R° groups together can form part of a fused ring which can be carbocyclic or heterocyclic in structure.

One of the important factors behind the photo reactive materials is the ability to manufacture the actual materials involved.

With the more simple photoreactive materials and only the simple materials the commonly known Quaternisations of Fisher Base Analogue synthesis route can be adopted. However as will be appreciated by those skilled in the art with the more complex photo reactive materials, particularly where branched chain alkyls are involved, the Quaternisations of Fisher Base Analogue route does not provide a viable synthesis route.

The photo reactive materials in accordance with the present invention can be synthesised using a route which has been pioneered by the present applicant and is broadly outlined in GB 2190088 with regard to 6' amino compounds and the disclosures of this case concerning the broad principles of the synthesis process are incorporated herein by way of reference.

However, in order to assist with the understanding of the synthesis route a broad outline is given below.

In the synthesis of these N-(branched)alkyl Fischer Bases the most important step is in the formation of the N-(branched)alkyl aniline derivative (1). A general synthetic route for the anilino derivatives is based upon work by A. R. Katritzky et al Org. Prep. Proceed. Int. Briefs, 1989, 21(3), 340-1; and J. Chem. Soc. Perkins Trans. 1, 1987, 799-804. The transformation required to convert the aniline (1) to the corresponding Fischer base (5) follows well known synthetic methods comprehensively covered by B. Robinson, The Fischer Indole Synthesis, Wiley-Interscience, 1982.

The general method employed for the synthesis of spiroindolinooxazines photochromics involves the condensation of an alkylidene indoline heterocycle (Fischer Base analogues) with a ortho-nitroso aryl alcohol as described in Applied Photochromic Polymer Systems, Blackie, Ed. C. B. McArdle, 1992, Chapter 2.

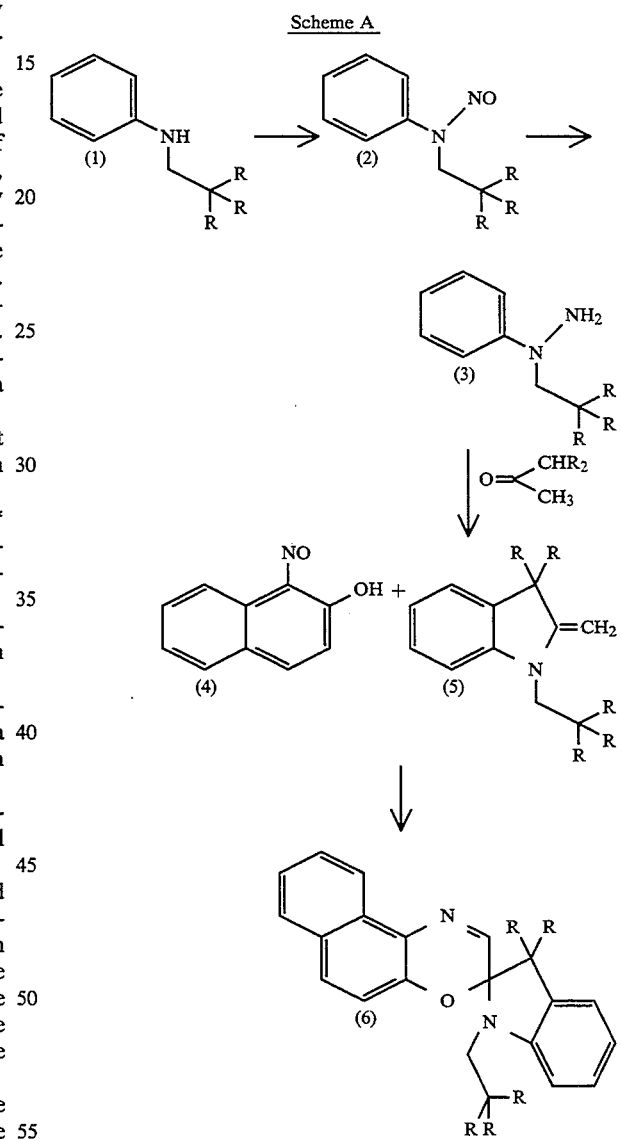

Scheme A

The photo reactive materials described above, when in use, are locked or encapsulated in a polymeric host material. It is preferred that the host material does not affect, for example, degrade or destroy the photo reactive material. However, most of the materials can operate effectively when this does not occur to a substantial degree.

Examples of suitable polymers for host materials are optically clear materials, for example, polymers of polyol(allyl carbonate)-monomers, polyacrylates, such as polymethylmethacrylates, cellulose acetate, cellulose triacetate, cellulose acetate propionate, cellulose acetate butyrate, poly(vinyl acetate), poly(vinyl alcohol), polyurethanes, polycarbonates, polyethylene terephthalate, polystyrene, poly(styrene methylmethacrylate) coopolymers, poly(styrene acrylonitrile) copolymers, and polyvinylbutyral. Transparent copolymers and blends of the transparent polymers are also suitable as host materials.

Preferably, the host material is an optically clear polymerized organic material such as triethylene glycol dimethacrylate (TEGDM) namely diethylene glycol bis(allyl carbonate), one form of which is sold under the trade name CR-39.

The invention will now be illustrated by way of example and test data.

The tests involved were primarily two fold, and details of these are given below:

A) Steady State Induced Optical Density

In this test 0.2% w/w concentration of the photo reactive material under test was dispersed in a polyurethane (1 mm thick) plate and illuminated at 20° C. by Xenon Arc filtered to Air Mass 2.

Once the sample sender test had reached a steady state data was taken.

B) Induced Optical Density against Temperature

In this test 0.05% w/w concentration of the photo reactive material under test was dispersed in a polyurethane (1 mm thick) plate and illuminated at a particular temperature by Xenon Arc filtered to Air Mass 2.

EXAMPLE 1

1,3-Dihydro-1,3-dimethyl-1-isobutyl-6'-(2,3-dihydroindol-1-yl)spiro[2H-indole-2,3'-3H-naphtho[2,1-b][1,4]oxazine]

A mixture of 4-indolino-1-nitroso-2-naphthol (0.90 g; 0.0031 mol) and 1,3-dihydro-3,3-dimethyl-1-isobutyl-2-methyleneindoline (0.66 g; 0.0031 mol) in 1,4-dioxan (40.0 ml) was stirred and heated under reflux for 72 h. The solution was evaporated and flash-chromatographed over silica (5% ethyl acetate in hexane) to give a brown gum which solidified on triturating with light petroleum (b.p. 30–40) to yield 1,3-Dihydro-3,3-dimethyl-1-isobutyl-6'-(2,3-dihydroindol-1-yl)spiro[2H-indole-2,3'-3H-naphtho[2,1-b][1,4]oxazine] as a yellow solid (0.88 g; 58%). m.p. 167°–8° C.

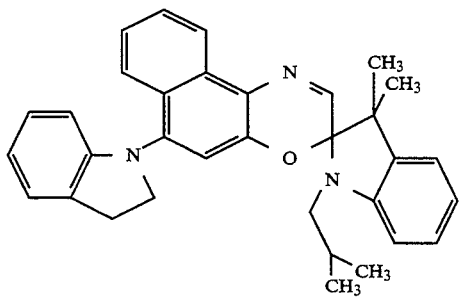

EXAMPLE 2

1,3-Dihydro-3,3-dimethyl-1-(2-ethylhex-1-yl)-6'-(2,3-dihydroindol-1-yl)spiro[2H-indole-2,3'-3H-naphtho[2,1-b][1,4]oxazine]

m.p 150°–3° C.

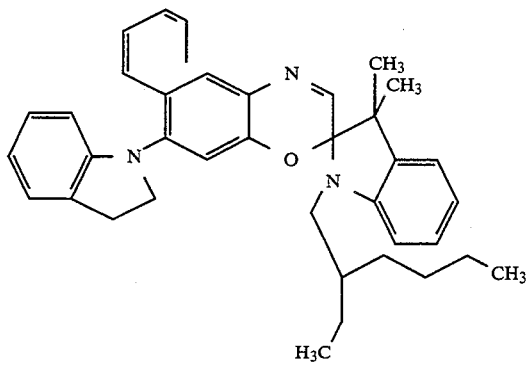

EXAMPLE 3

1,3-Dihydro-3,3-dimethyl-1-cyclohexylmethyl-6'-(2,3-dihydroindol-1-yl)spiro[2H-indole-2,3'-3H-naphtho[2,1-b][1,4]oxazine]

m.p. 148°–50° C.

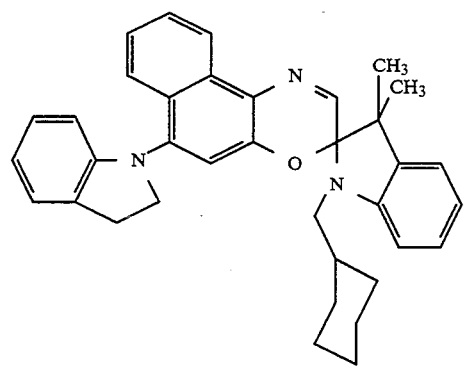

EXAMPLE 4

1,3-Dihydro-3,3-dimethyl-1-(2-phenylprop-1-yl)-6'-(2,3-dihydroindol-1-yl)spiro[2H-indole-2,3'-3H-naphtho[2,1-b][1,4]oxazine]

m.p. 199°–201° C.

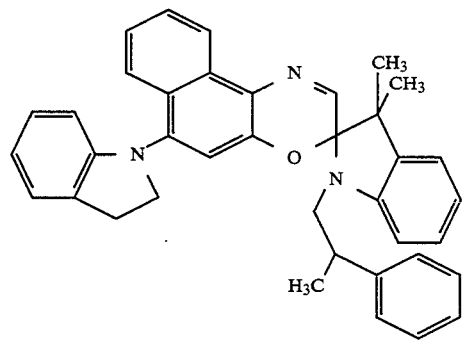

EXAMPLE 5

1,3-Dihydro-3,3-dimethyl-1-neopentyl-6'-(2,3-dihydroindol-1-yl)spiro[2H-indole-2,3,'-3H-naphtho[2,1-B][1,4]oxazine m.p.149.5°–51° C.

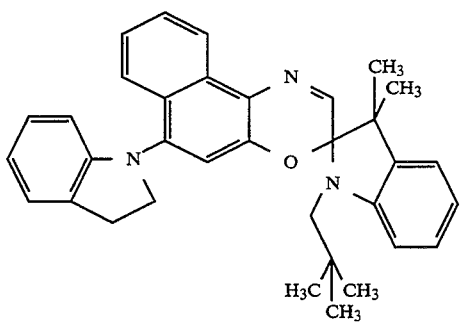

COMPARATIVE EXAMPLE 1

1,3-Dihydro-1,3,3-trimethyl-6'-(2,3-dihydroindol-1-yl)spiro[2H-indole-2,3'-3H-naphtho[2,1-b][1,4]oxazine]

A mixture of 1-nitroso-2-naphthol (17.3 g; 0.10 mol) and indoline (23.8 g; 0.20 mol) in trichloroethylene (150 ml) was heated under reflux for 10 min. A solution of 1,3-dihydro-1,3,3-trimethyl-2-methyleneindoline (17.3 g; 0.1 mol) in trichloroethylene (100 ml) was added in one batch and the resulting mixture heated under reflux for 1 h. The solution was evaporated and the oily residue treated with acetone to yield 1,3-Dihydro-1,3,3-trimethyl-6'-(2,3-dihydroindol-1-yl)spiro [2H-indole-2,3'-3H-naphtho[2,1-b][1,4]oxazine] as a yellow solid (4.44 g; 10%).

m.p 255°–7° C.

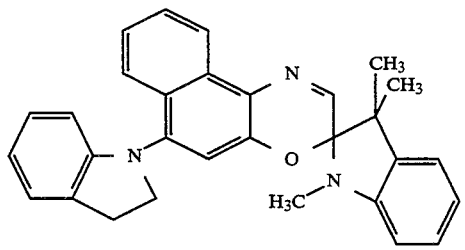

COMPARATIVE EXAMPLE 2

1,3-Dihydro-3,3-dimethyl-1-isopropyl-6'-(2,3-dihydroindol-1-yl)spiro[2H-indole-2,3'-3H-naphtho[2,1-b][1,4]oxazine]

m.p. 175°–78° C. (decomp.)

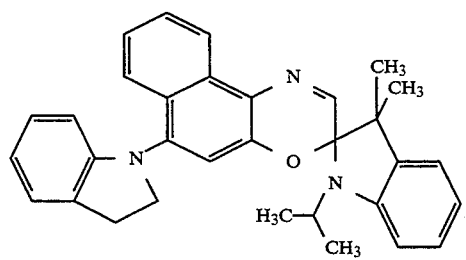

COMPARATIVE EXAMPLE 3

1,3-Dihydro-3,3-dimethyl-1-isopentyl-6'-(2,3-dihydroindol-1-yl)spiro[2H-indole-2,3'-3H-naphtho[2,1-b][1,4]oxazine]

m.p. 116°–18° C. (decomp)

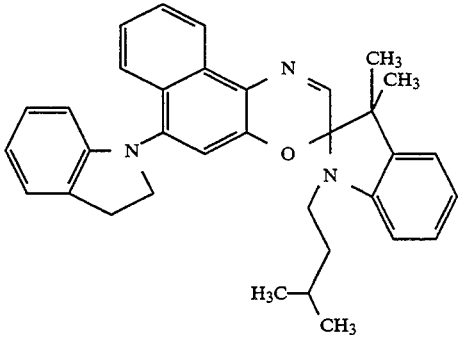

TABLE 1

| | Steady State Induced Optical Density (IOD) | | |
|---|---|---|---|
| | bleached IVT | darkened IVT | IOD IVT |
| Example | | | |
| 1 | 70.9 | 1.1 | 1.79 |
| 2 | 77.7 | 0.9 | 1.92 |
| 3 | 76.7 | 1.1 | 1.86 |
| 4 | 83.8 | 0.9 | 1.99 |
| 5 | 77.6 | 0.4 | 2.30 |
| Comparative Examples | | | |
| 1 | 89.9 | 6.0 | 1.18 |
| 2 | 87.8 | 5.7 | 1.19 |
| 3 | 80.3 | 2.1 | 1.59 |

TABLE 2

| | IOD Vs. Temperature | | | |
|---|---|---|---|---|
| | 14° C. | 21° C. | 30° C. | 38° C. |
| Example | | | | |
| 1 | 1.56 | 1.22 | 0.94 | 0.58 |
| 2 | 1.49 | 1.28 | 0.97 | 0.63 |
| 4 | 1.43 | 1.24 | 0.95 | 0.55 |
| 5 | 1.84 | 1.43 | 1.37 | 0.96 |
| Comparative Example 1 | 1.19 | 0.85 | 0.55 | 0.29 |

EXAMPLE 6

1,3-Dihydro-3,3-dimethyl-1-neopentylspiro[2H-indole-2,3'-3H-naphtho[2,1-b][1,4]oxazine]

A mixture of 1-nitroso-2-naphthol (0.34 g; 0.002 mol) and 1,3-dihydro-3,3-dimethyl-2-methylene-1-neopentylindoline (0.46 g; 0.002 mol) in methanol (25.0 ml) was heated under reflux for 4.5 h. The solution was evaporated and the residue flash-chromatographed over silica (5% diethyl ether in hexane) to give a yellow gum which solidifed on trituration with acetone to afford 1,3-Dihydro-3,3-dimethyl-1-neopentylspiro[2H-indole-2,3'-3H-naphtho[2,1-b][1,4]oxazine] as a white solid (0.56 g; 73%).

m.p. 167°–70° C.

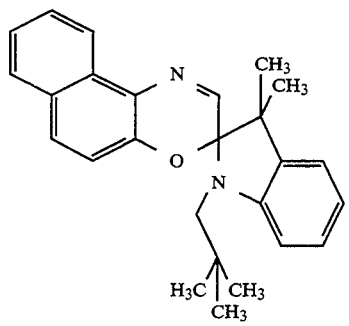

EXAMPLE 7

1,3-Dihydro-3,3-dimethyl-1-isobutylspiro[2H-indole-2,3'-3H-naphtho[2,1-b][1,4]oxazine ]

m.p. 159°–60° C.

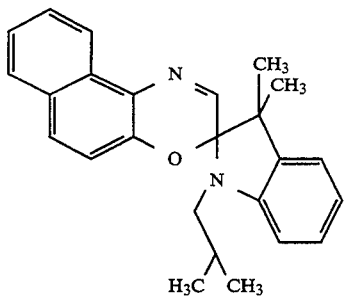

EXAMPLE 8

1,3-Dihydro-3,3-dimethyl-1- (2-phenylprop-1-yl) spiro[2H-indole-2,3'-3H-naphtho[2, 1-b][1,4]oxazine]

m.p. 136°–141° C.

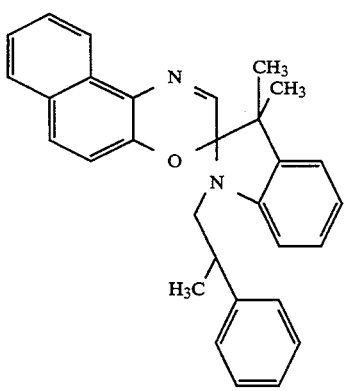

COMPARATIVE EXAMPLE 4

1,3-Dihydro-1,3,3-trimethylspiro[2H-indole-2,3'-3H-naphtho[2,1-b][1,4]oxazine]

A mixture 1,3-dihydro-1,3,3-trimethyl-2-methyleneindoline (3.62 g; 0.021 mol) and 1-nitroso-2-naphthol (3.46 g; 0.02 mol) in ethanol (80.0 ml) was heated under reflux for 2 h. The solution was evaporated and the residue flash-chromatographed over silica (dichloromethane) to give 1,3-Dihydro-1,3,3-trimethyl-spiro[2H-indole-2,3'-3H-naphtho[2,1-b][1,4]oxazine] as a pale yellow solid (3–96 g; 60%).

m.p. 127°–30° C.

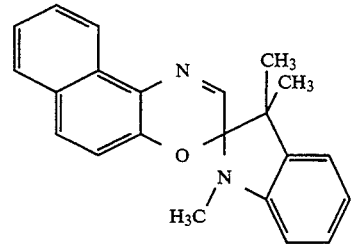

COMPARATIVE EXAMPLE 5

1,3-Dihydro-3,3-dimethyl-1-benzylspiro[2H-indole-2,3'-3H-naphtho[2,1-b][1,4]oxazine]

m.p. 202°–4° C.

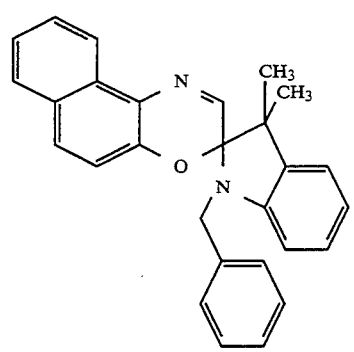

COMPARATIVE EXAMPLE 6

1,3-Dihydro-3,3-dimethyl-1-octadecylspiro[2H-indole-2,3'-3H-naphtho[2,1-b][1,4]oxazine]

m.p. 65° C.

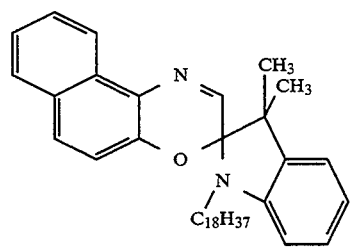

TABLE 3

| Steady State Induced Optical Density (IOD) | | | |
|---|---|---|---|
| | bleached IVT | darkened IVT | IOD IVT |
| Example | | | |
| 6 | 88.3 | 21.3 | 0.77 |
| 7 | 90.2 | 27.5 | 0.52 |
| 8 | 89.5 | 24.2 | 0.57 |
| Comparative Example | | | |
| 4 | 88.7 | 47.9 | 0.27 |
| 5 | 81.7 | 48.1 | 0.23 |
| 6 | 87.9 | 49.2 | 0.25 |

EXAMPLE 9

1,3-Dihydro-3,3-dimethyl-1-(2-phenylprop-1-yl)-6'-(p-diethylaminophenyl)spiro[2H-indole-2,3'-3H-naphtho[2,1-b][1,4]oxazine]

A mixture of 4-(p-diethylaminophenyl-1-nitroso-2-hydroxynaphthalene (5.76 g; 0.018 mol) and 1,3-Dihydro-3,3-dimethyl-1-(2-phenylprop-1-yl)-2-methyleneindoline (4.98 g; 0.018 mol) in methanol (175.0 ml) was heated under reflux for 22 h. The solution was evaporated and the residue flash-chromatographed over silica (10% diethyl ether in hexane) to give a green gum which solidifed upon treatment with petroleum ether (b.p. 40–60) to yield 1,3-Dihydro-3,3-dimethyl-1-(2-phenylprop-1-yl)-6'-(p-diethylaminophenyl)spiro[2H-indole-2,3'-3H-naphtho[2,1-b][1,4]oxazine] as a pale green solid (1.08 g; 10%).

m.p. 74°–80° C.

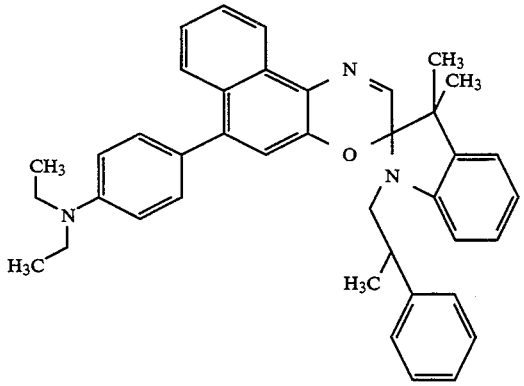

EXAMPLE 10

1,3-Dihydro-3,3-dimethyl-1-neopentyl-6'-(p-diethylaminophenyl)spiro[2H-indole-2,3'-[3H]naphth[2,1-b][1,4]oxazine]

m.p. 190°–3° C.

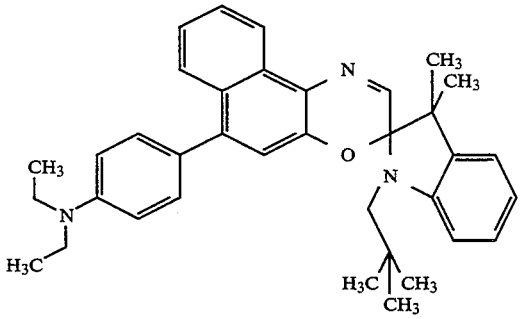

COMPARATIVE EXAMPLE 7

1,3-dihydro-1,3,3-trimethyl-6'-(p-diethylaminophenyl)-spiro[2H-indole-2,3'-[3H]naphth[2,1-b][1,4]oxazine]

A solution of 4-(p-diethylaminophenyl)-1-nitroso-2-hydroxynaphthalene (0.85 g; 0.0027 mol) and 1,3-dihydro-1,3,3-trimethyl-2-methyleneindoline (0.5 g; 0.0029 mol) in methanol (60 ml) under nitrogen, was heated under reflux for 24 hours. The solution was then evaporated and chromatographed over silica (1 part diethyl ether to 10 parts pet. ether) to afford 1,3-dihydro-1,3,3-trimethyl-6'-(p-diethylaminophenyl)spiro[2H-indole-2,3'-[3H]naphth[2,1-b][1,4]oxazine] (0.47 g; 36%) as a yellow solid.

m.p. 157°–8° C.

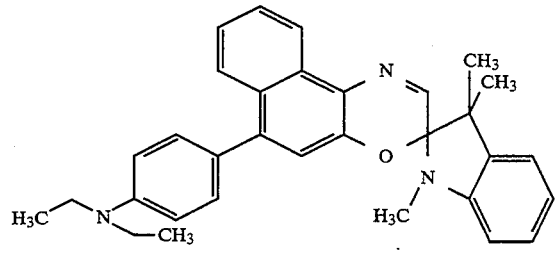

TABLE 4

| | Steady State Induced Optical Density (IOD) | | |
|---|---|---|---|
| | bleached IVT | darkened IVT | IOD IVT |
| Example | | | |
| 9 | 87.9 | 29.1 | 0.48 |
| 10 | 83.8 | 8.8 | 0.98 |
| Comparative Example 7 | 87.7 | 48.2 | 0.26 |

We claim:
1. A photo reactive material having the following structure:

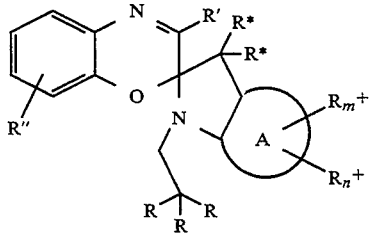

where

A is a six membered carbocyclic or heterocyclic ring; in the group —CH$_2$—C(R)$_3$
  (i) each of the R groups is an alkyl or
  (ii) one of the R groups is hydrogen and the other R groups are independent of one another and are an alkyl, alkenyl, alkynyl or aryl group, or the two R groups together form part of a carbocyclic or heterocyclic ring;

R* are independent of one another and are a branched or linear C$_1$–C$_{10}$ alkyl group or a carbocyclic or heterocyclic group or both form part of a carbocyclic or heterocyclic ring;

R$_m$+ is an alkyl alkoxy, amino, halogen, cyano, nitro, trifluoromethyl or aryl group and m has a value from 0 to 4;

R$_n$+ is a carbocyclic or heterocyclic group which is fused to A and n has a value from 0 to 2;

R' is a hydrogen, alkyl, alkoxy, amino, carbocyclic or heterocyclic group;

R" is a hydrogen atom, alkyl, aryl, heteroaryl, alkenyl, alkynyl, alkoxy, aryloxy, amino, halogen, cyano, nitro, trifluoromethyl, imino, azo, carboxy ester or amide group or is a carbocyclic or heterocyclic group fused to the moiety.

2. A photo reactive material which has the following structure:

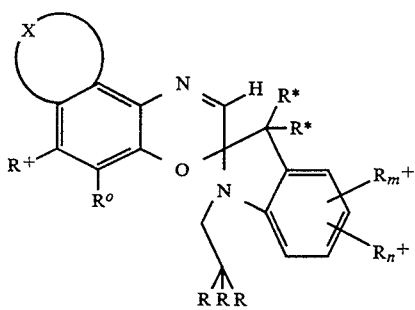

where
in the group —CH$_2$—C(R)$_3$
(i) each of the R groups is an alkyl group or
(ii) one of the R groups is hydrogen and the other R groups are independent of one another and are an alkyl, alkenyl, alkynyl or aryl group, or the two R groups together form part of a carbocyclic or heterocyclic ring;

R* are independent of one another and are a branched or linear C$_1$–C$_{10}$ alkyl group or a carbocyclic or heterocyclic group or both form part of an alicyclic ring;

R+$_m$ is a hydrogen atom, aryl, alkyl, alkoxy, amino, halogen, cyano, nitro group and m has a value from 0 to 4;

R$_n$+ is a carbocyclic, heterocyclic, aryl or heteroaryl group and n has a value from 0 to 2;

R+ are independent and are a hydrogen atom, alkyl, aryl, heteroaryl, alkenyl, alkynyl, alkoxy, aryloxy, amino, halogen, cyano, nitro, trifluromethyl, imino, azo, carboxy ester or amide group or both form part of a carbocyclic or heterocyclic ring;

R° is a hydrogen atom, alkyl, alkoxy, acyl, phenyl, halogen, cyano, nitro, amine, or trifluro methyl group or form part of an alicyclic, acyl or hetero aryl group;

and

X is nitrogen or a —CH— group contained in a carbocyclic ring or heterocyclic ring.

3. A photoreactive material as claimed in claim i or claim 2 wherein at least two of the R groups form part of an alicyclic ring which is cyclohexyl, adamantyl or norbornyl in structure.

4. A photo reactive material as claimed in any one of the preceding claims, wherein R* are independent of one another and are a methyl, ethyl, n-propyl, isopropyl, n-butyl, isobutyl, t-butyl, n-pentyl, neopentyl or isopentyl group.

5. A photo reactive material as claimed in any one of claims 1 to 3, wherein the the R* groups form part of an alicyclic ring which is cyclo hexyl, adamantyl or norbornyl in structure.

6. A photo reactive material as claimed in claim 1 or claim 2, wherein the R+ and R° groups together form part of a fused ring which is carbocyclic or heterocyclic in structure.

7. 1,3-Dihydro-3,3-dimethyl-1-isobutyl-6'-(2,3-dihydroindol-1-yl) spiro[2H-indole-2,3'-3H-naphtho[2,1-b][1,4]oxazine].

8. 1,3-Dihydro-3,3-dimethyl-1-(2-ethylhex-1-yl)-6'-(2,3-dihydroindol-1-yl)spiro[2H-indole-2,3'-3H-naphtho[2,1-b][1,4]oxazine].

9. 1,3-Dihydro-3,3-dimethyl-1-cyclohexylmethyl-6'-(2,3-dihydroindol-1-yl)spiro[2H-indole-2,3'-3H-naphtho[2,1-b][1,4]oxazine].

10. 1,3-Dihydro-3,3-dimethyl-1- (2-phenylprop-1-yl) -6'-(2,3-dihydroindol-1-yl)spiro[2H-indole-2,3'-3H-naphtho[2,1-b][1,4]oxazine].

11. The photo reactive material of claim 1, wherein the group —CH$_2$—C(R)$_3$ is

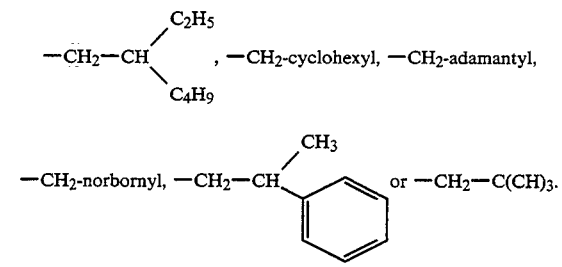

12. 1,3-Dihydro-3,3-dimethyl-1-neopentylspiro[2H-indole-2,3'-3H-naphtho[2,1-b][1,4]oxazine].

13. 1,3-Dihydro-3,3-dimethyl-1-isobutylspiro[2H-indole-2,3'-3H-naphtho[2,1-b][1,4]oxazine].

14. 1,3-Dihydro-3,3-dimethyl-1-(2-phenylprop-1-yl)spiro[2H-indole-2,3'-3H-naphtho[2,1-b][1,4]oxazine].

15. 1,3-Dihydro-3,3-dimethyl-1-(2-phenylprop-1-yl)-6'-(p-diethylaminophenyl)spiro[2H-indole-2,3'-3H-naphtho[2,1-b][1,4]oxazine].

16. 1,3-dihydro-3,3-dimethyl-1-neopentyl-6'-(p-diethylaminophenyl)spiro[2H-indole-2,3'-[3H ]naphth[2,1-b][1,4]oxazine].

17. The photo reactive material of claim 2, wherein the group —CH$_2$—C(R)$_3$ is

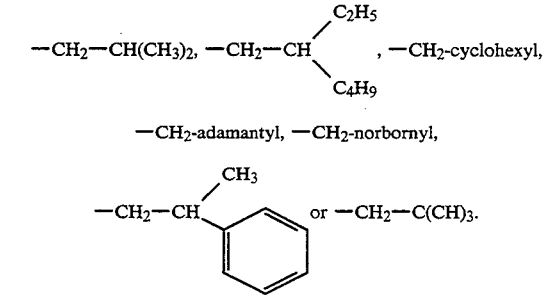

18. 1,3-Dihydro-3,3-dimethyl-1-neopentyl-6'-(2,3-dihydroin dol-1-yl)spiro[2H-indole-2,3-'3H-naphtho[2,1-B][1,4]oxazine].

* * * * *